Dec. 13, 1949  G. H. LEONARD  2,490,821
APPARATUS FOR TESTING FLUID OPERATED SWITCHES
Filed Oct. 10, 1947  5 Sheets-Sheet 1

G. H. Leonard, Inventor

By M. Hayes

Attorney

Dec. 13, 1949     G. H. LEONARD     2,490,821
APPARATUS FOR TESTING FLUID OPERATED SWITCHES
Filed Oct. 10, 1947     5 Sheets-Sheet 2

Inventor
G. H. Leonard
By M. O. Hayes
Attorney

Inventor
G. H. Leonard
M. O. Hayes
By
Attorney

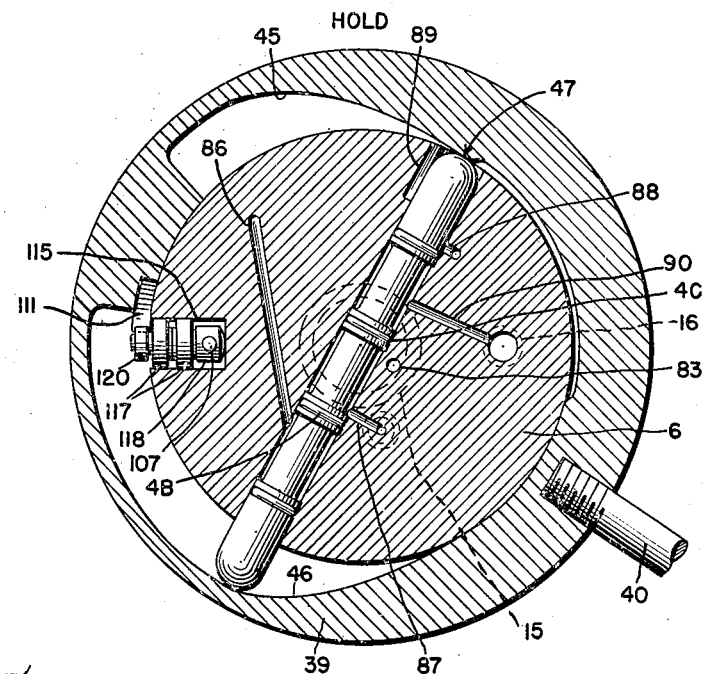
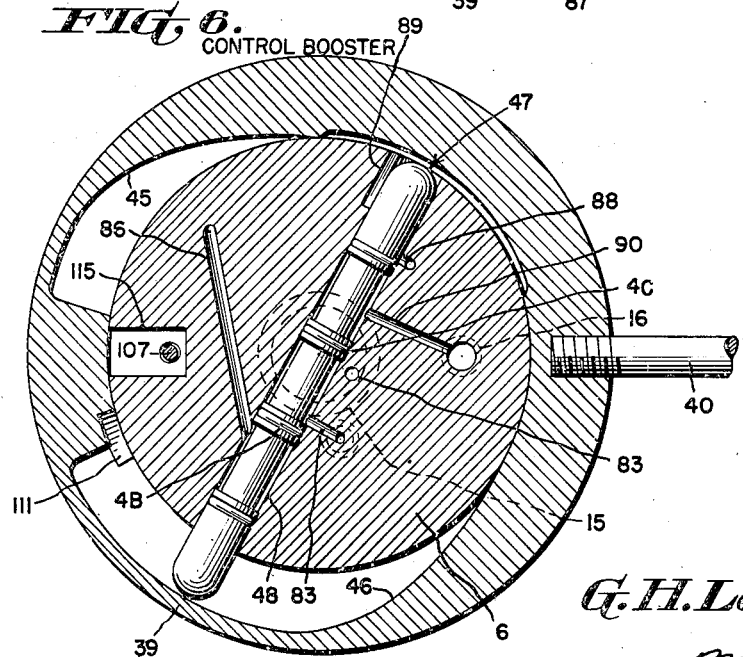

Dec. 13, 1949     G. H. LEONARD     2,490,821
APPARATUS FOR TESTING FLUID OPERATED SWITCHES
Filed Oct. 10, 1947     5 Sheets-Sheet 5
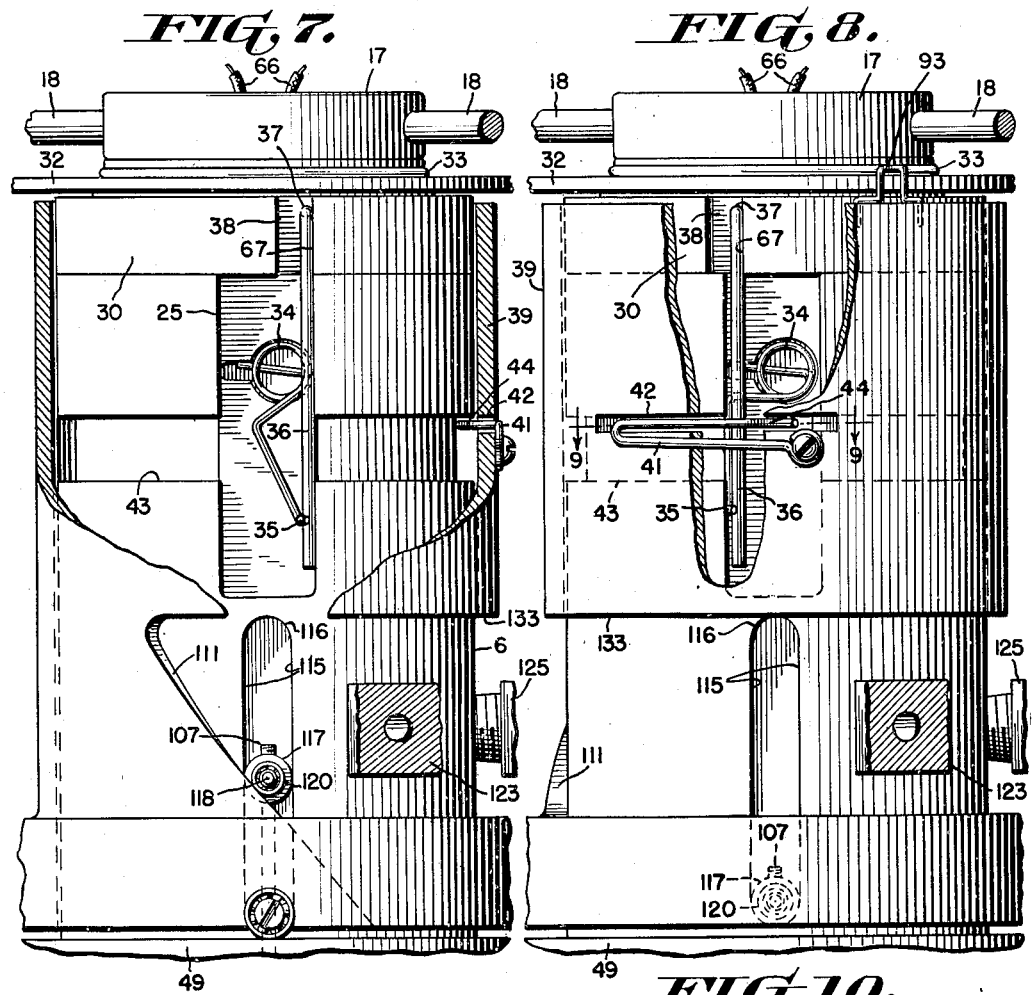
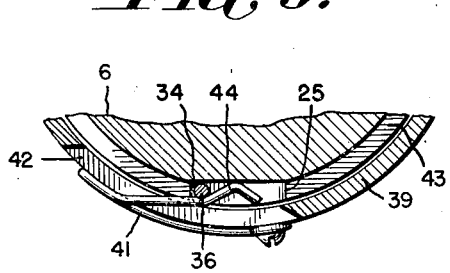
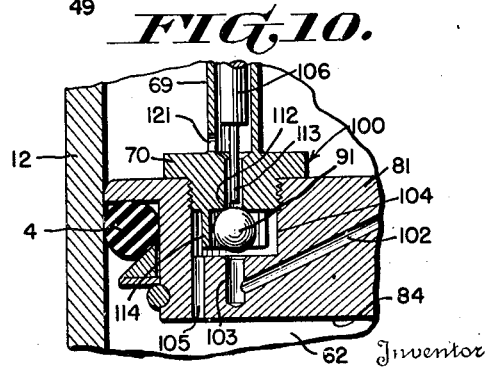
Inventor
G. H. Leonard
By M. C. Hayes
Attorney Patented Dec. 13, 1949

2,490,821

UNITED STATES PATENT OFFICE 2,490,821

APPARATUS FOR TESTING FLUID OPERATED SWITCHES

George H. Leonard, Fairfield, Conn.

Application October 10, 1947, Serial No. 779,088

11 Claims. (Cl. 73—4)

(Granted under the act of March 3, 1883, as amended April 30, 1928; 370 O. G. 757)

The present invention relates generally to testing apparatus and more particularly to a hydraulic test set wherein pressure devices such, for example, as pressure responsive electric switches selectively may be subjected to pressures of widely varying intensities, thereby to accurately determine their pressure responsive characteristics.

In a modern underwater mine there is generally employed a number of electric switches of the pressure responsive type. These switches are constructed and arranged in such a manner within the arming and firing circuits of the mine as to make and break various connections therein in predetermined sequence as the mine sinks through the water. The accuracy of these switches contributes greatly to the effectiveness of the mine.

It was found during the development of mines of this type that a large percentage of the hydraulic switches used therein were operating at pressures considerably above or below their respective pressure ratings, a fact which necessitated the testing of each switch before installation thereof in the mine control mechanism.

The task of testing these switches by methods heretofore employed proved to be not only expensive but resulted in considerable delay in the production of such mines, particularly when the respective pressure responsive character of the switches used therein varied to any great degree. This condition generally required that each switch be mounted and separately tested in apparatus suitable only for testing switches of a particular pressure response which necessitated several pieces of apparatus for testing the switches used in a single mine of the aforedescribed type.

It is desired by the present invention to provide a single hydraulic test set capable of wide range application wherein pressures from 0 to 1000 pounds per square inch may be generated and indicated on a dial system for the purpose of testing hydraulic apparatus that may vary widely in their pressure response.

It is an object of the present invention to provide a new and improved hydraulic test set capable of providing a wide range of pressures for testing pressure responsive apparatus.

It is a further object to provide a hydraulic test set having wide range of pressure application wherein pressure responsive apparatus such, for example, as pressure responsive electric switches, may be tested by subjecting them to pressures in excess of their pressure ratings though their respective pressure responses may vary to a great degree.

A still further object is to provide a hydraulic test set in which the pressure range thereof is measured by a plurality of gauges and in which pressure is blocked off in sequence from the gauges when the pressure applied thereto becomes greater than that for which the gauges were calibrated.

A still further object of the device is to provide a hydraulic test set wherein a predetermined volume of oil is automatically maintained at all times within the test chamber of the apparatus.

Another object is to provide a hydraulic test set wherein the volume of liquid within the test chamber and the pressure applied thereto as well as the locking of the closure therefor and the exhausting of the system is controlled by a single control handle.

A further object is to provide a hydraulic test set for testing small pressure responsive apparatus wherein the closure for the test chamber thereof is secured against removal therefrom while pressure remains in the chamber.

It is a still further object of the invention to provide a hydraulic test for rapidly testing hydraulic electric switches or the like wherein with a supply of gaseous pressure from 50 to 100 pounds per square inch the set is capable of generating and accurately indicating pressures of from 0 to 1000 pounds per square inch.

Additional objects, features and advantages of the present invention are those residing in and relating to the novel construction and arrangement of parts forming a preferred embodiment thereof, as will more clearly appear from the following description, reference being made to the accompanying drawings, of which:

Fig. 5 is a sectional view of the selector valve assembly illustrating the valve in its "Hold" position;

Fig. 6 is a sectional view of the selector valve assembly illustrating the valve in its "Control booster" position;

Fig. 7 is a cutaway view of the sleeve member showing in elevation the cap locking mechanism in the locking position thereof;

Fig. 8 is a cutaway view of the sleeve member showing in elevation the cap locking mechanism in the cap releasing position thereof;

Fig. 9 is a sectional view taken along the line 9—9 of Fig. 8 and showing the position of the spring detent, bar member, and torsion spring when the cap locking mechanism is in the cap releasing position;

Fig. 10 is an enlarged fragmentary sectional view of the pressure booster control valve assembly;

Figure 1:
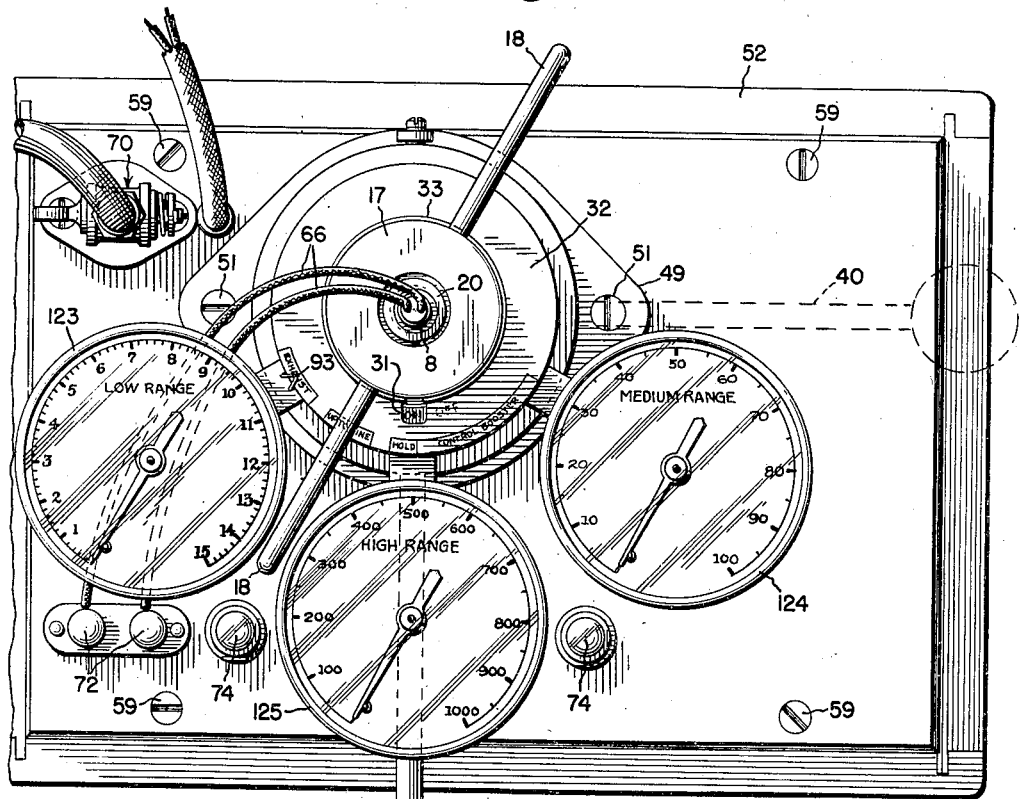
Fig. 1 is a plan view of the preferred embodiment of the invention as mounted within the support therefor.
Figure 2:
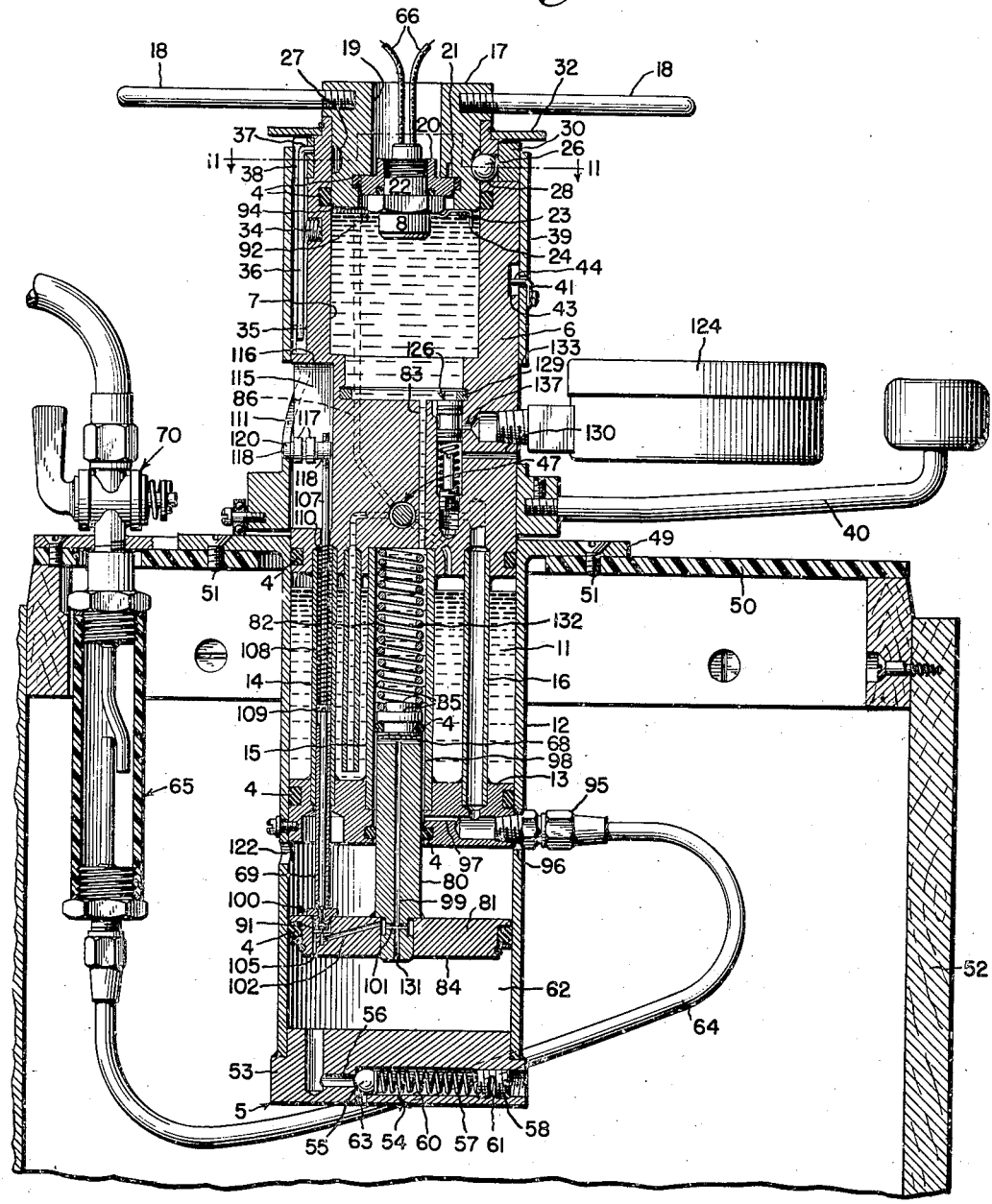
Fig. 2 is a view partly in section and partly in elevation of the preferred embodiment of the invention.

Referring now to the drawings and more particularly to Figs. 1 and 2, there is shown thereon a hydraulic testing apparatus, generally designated 5, which includes a body member 6 having therein a test chamber or receptacle 7 wherein high pressures may be generated for the purpose of testing pressure responsive apparatus such, for example, as a pressure responsive electric switch 8. The chamber 7 is suitable for holding a quantity of oil or other fluid, the replenishing thereof being communicated to the chamber through the connection 86 leading from a reservoir 11 located beneath the body and formed by the tubular casing 12 and by disk 13, affixed to the body member in space relation thereto by the tubular supports 14, 15 and 16 preferably welded to the two members respectively.

Formed for closing the test chamber is a plug or cap piece 17 having provided thereon a pair of radially projecting handle pieces 18 whereby the cap may be placed on or lifted from the chamber opening.

Arranged within the cap is an axial bore 19 wherein a suitable adapter 20 may be secured, as by screw 21, for supporting within the test chamber 7 the apparatus to be tested such as the pressure responsive switch 8. A spring latch 22, pivotally connected to the edge of cap 17 by screw 23, is operative to retain the switch in test position within the adapter, the latch being manually rotatable into and out of switch retaining position by the handle portion 24 thereof.

A satisfactory pressure retaining seal is maintained, where necessary, throughout the various interfitted components of the device by what is known as O rings 4 formed from "neoprene" or other suitable resilient material, the rings being arranged conventionally in grooves provided therefor in the respective parts of the device, and are operative, when compressed between two interfitting parts, to form a substantially indestructible seal therebetween.

Figure 11:
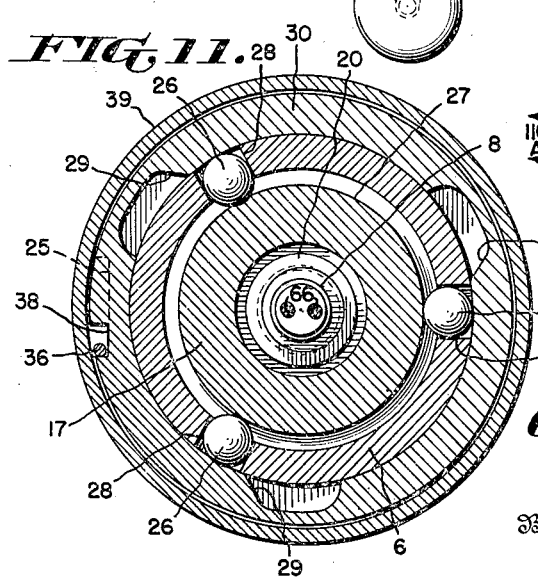
Fig. 11 is a sectional view taken along line 11—11 of Fig. 2 and showing the position of the cap, cam ring, and balls when the cap locking mechanism is in cap locking position.

The cap 17 is secured to the body member 6 during the testing operation of the device by a plurality of balls 26 formed preferably of steel and movable into an interlocking position between the body and annular groove 27 of the cap through radially arranged apertures 28 provided therefor in the body wall, as illustrated in Fig. 11. The balls are so arranged with respect to the cam surfaces 29 in ring 30 as to be cammed inwardly to engage groove 27 of the cap as the ring 30 is rotated to its "on" position, as indicated by the inscription "On" thereon becoming visible through the notch 31, Fig. 1, provided therefor in the fixed dial ring 32. The balls are in their cap releasing position when the inscription "Off," inscribed on the ring becomes visible through notch 31.

The cam ring 30 is adapted to be rotated to "On" or cap locking position by means of a manipulatable lever or handle 40 operatively connected therewith through yieldable driving connections comprising a torsion spring 34, the spring being secured to the body member 6 for movement within a recess 25 therein in such a manner as to drive the ring in a counterclockwise or locking direction through the bar member 36 which is pivotally connected to the ring as at 37 within groove 38 therein and extends into recess 25 in the body member. The bar, by bearing against shoulder 67 of groove 38 when driven against the shoulder by torsion spring 34, is operative to rotate the ring notwithstanding the pivotal connection therebetween.

Thus, the ring is normally maintained by spring 34 in the "on" position thereof illustrated in Fig. 7. However, as sleeve 39 to which handle 40 is secured is rotated by the handle to the exhaust position of the sleeve illustrated in Fig. 8, an angular spring member 41, carried by the sleeve and having a detent portion 44 received within a circumferential groove 43 interconnecting recess 25 in body member 6, engages bar 36 therein substantially midway between ring 30 and the point of contact 35 of spring 34 with the bar and moves the bar clockwise without pivotal movement thereof at 37, thereby to simultaneously compress spring 34 and rotate ring 30 to the "off" position.

When cam ring 30 offers a predetermined resistance to movement thereof as a result of pressure remaining in the test chamber, bar 36 is first pivotally moved into contact with shoulder 67 and thereafter spring 41 slides over bar 36 whereupon it is forced outwardly of notch 42 in sleeve 39, whereby sleeve 39 may be rotated to the exhaust position without effecting release of the cap. The slipping of spring 41 by the bar leaves ring 30 in its cap locking position until such time as the pressure within the test chamber is reduced to a predetermined value. To rotate the ring after spring 41 has once slipped by bar 36, the sleeve 39 must be rotated counterclockwise until the spring 41 snaps over the bar, thereby enabling the ring to be rotated in the aforedescribed manner to the "off" position by movement of handle 40.

Sleeve 39 carries a pointer 93 which is adapted to be moved into relation with the indicia means "Exhaust," "Up to line," "Hold" and "Control booster" for indicating various positions of the sleeve with respect to body 6 this indicia means preferably being engraved on a fixed dial 32 secured to body 6 by the snap ring 33.

Figure 3:
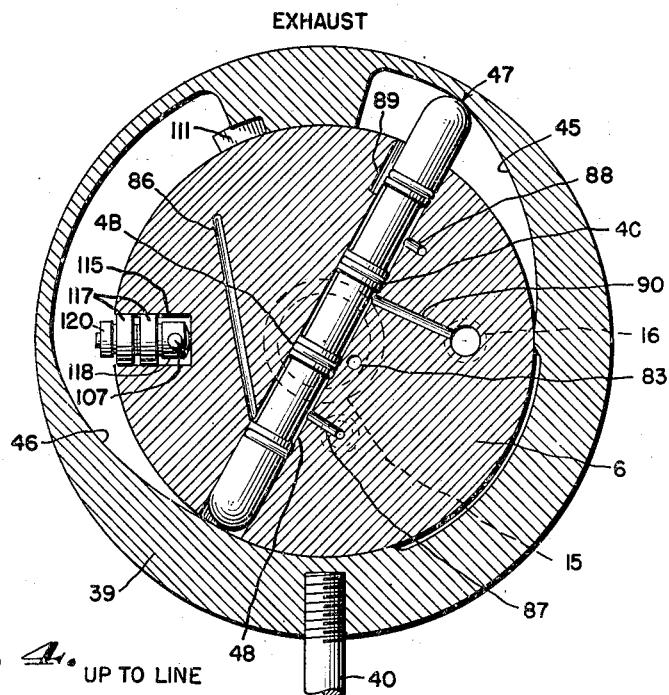
Fig. 3 is a sectional view of the selector valve assembly taken along the line 3—3 of Fig. 2 and illustrating the valve in its "Exhaust" position.

The handle 40 as it rotates sleeve 39 is also operative by means of the cam surfaces 45 and 46 on the sleeve, to control the flow of fluid within the device by positioning a selector valve assembly generally designated 47, Fig. 3, at various positions within bore 48 therefor. The valve 47 is operative to selectively connect various fluid circuits throughout the device in predetermined sequence as the valve is moved within bore 48, as will be more fully described as the description proceeds.

The casing 12 within which the body member 6 is partially arranged, is provided at its upper end with an outwardly extending flange portion 49 whereby the device is supported from a mounting panel 50 to which it is secured by screws 51. The panel is secured to a suitable supporting case or housing 52 by screws 59.

The lower end of the casing 12 is closed by a plug member 53 preferably welded thereto in a manner to form a pressure sealing connection therebetween. The plug 53 has arranged therein a pressure relief assembly generally designated 54 including a ball check 55 adapted to be yieldably retained in closing position against the seat of port 56 by spring 57 interposed between the ball and an adjustable retaining plug 58. Plug 58 may be adjusted in the usual manner to vary the pressure response of the ball against the valve seat by controlling the compression of spring 57 thereagainst. A notch 61 provided in the plug 58 permits it to be distorted sufficiently to bind in self-locking engagement with the threaded portion of the bore to thereby remain in whatever position adjusted. From the foregoing structure, it is apparent to those familiar with such apparatus, that when the pressure within chamber 62 exceeds the force applied to the ball check 55 by spring 57, the ball separates from the seat to exhaust the pressure into the surrounding atmosphere through port 63.

For a better understanding of the device and the relation of the respective parts thereof, attention will now be directed to its operation, it being assumed for the purpose of description, that a quantity of air or other suitable gas under approximately 100 pounds pressure is supplied to the mechanism through the pet cock assembly generally designated 70. Connection is made from the pet cock to the gas chamber 62 of the device through the fluid conduit 64 within which is connected a moisture trap 65 adapted to separate from the gas entering the tester such undesirable matter as oil or moisture that might otherwise interfere with the proper operation of the device.

Figure 12:
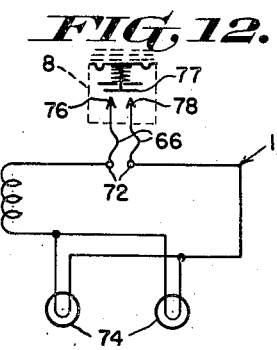
Fig. 12 is a view of the electric circuit diagram as used in the invention.

The apparatus to be tested, namely the pressure responsive switch 8, is first secured within cap 17 before the cap is locked to the body member in the manner heretofore described. The leads 66 of the switch extend out through bore 19 of the cap to make connection with the signal circuit generally designated 119, Fig. 12, at the terminal pins 72 as illustrated in Fig. 1. The signal circuit comprises a filament transformer 73 connected in a manner to supply a voltage to a pair of signal lamps 74 to cause the illumination thereof when the circuit is closed thereto through contacts 76, 77, and 78 of switch 8 when sufficient hydraulic pressure is applied thereto by the oil in chamber 7.

The pressure of the oil within the test chamber is controlled by the upward movement of piston 80 in response to gaseous pressure being applied to the enlarged base portion 81 thereof by the gas within chamber 62. The upward movement of the piston is operative to drive a portion of the oil from cylinder or receptacle 82, within which the piston is slideably mounted, into the test chamber 7 through the fluid connection 83 connected therebetween, thereby to raise the pressure within the test chamber in proportion to the gaseous pressure applied to the base of the piston. The ratio of the large surface area 84 of the piston relative to the reduced upper surface area 85 thereof, determining the effective pressure increase of the booster assembly.

As previously mentioned, the movement of sleeve 39 by handle 40 is operative by means of the cam surfaces 45 and 46 to position the selector valve 47 at various positions within the body 6 to thereby connect a multiplicity of fluid circuits throughout the device in proper sequence to obtain the pressure conditions desired of the apparatus.

Fig. 3 illustrates the selector valve 47 in its initial or "Exhaust" position whereby any pressure within the test chamber 7 is exhausted through the reservoir 11 into the atmosphere by way of the connections 86, 87, 88, and 89 now in fluid circuit through the valve. The connection 86 leading from the top of the test chamber connects with the bottom of the reservoir through the conduit 87. The fluid connection 88 leading from the top of the resorvoir is shown in circuit with the surrounding atmosphere through the port 89. When the valve is in the "Exhaust" position the air supply line 90, through which is supplied the gaseous pressure for the oil filled portion of the system, is closed off by the O rings 4B and 4C.

Figure 4:
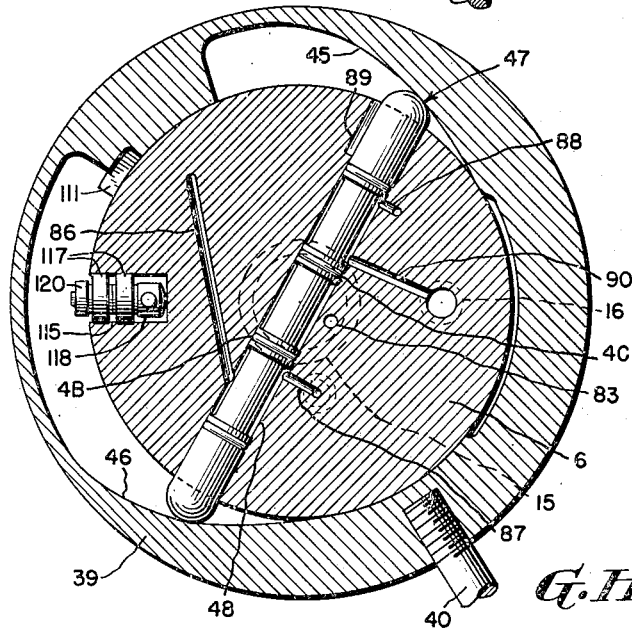
Fig. 4 is a sectional view of the selector valve assembly illustrating the valve in its "Up to line" position.
Figure 13:
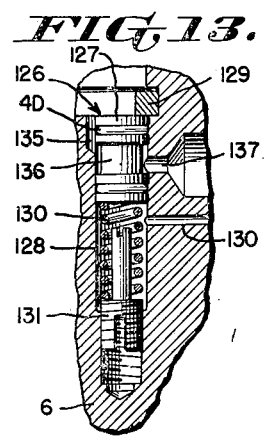
Fig. 13 is an enlarged sectional view of a gauge pressure cut off valve assembly.

When sleeve 39 is moved to "Up to line pressure" position as illustrated in Fig. 4, valve 47 is operative to close off the exhaust port 89 and connect air line 90 with the oil filled portion of the system thereby to apply pressure to the oil in the reservoir through connection 88 to drive a portion of the oil from the reservoir out through the connection 87 and into the test chamber through connection 86. The quantity of oil introduced into the test chamber in this manner is governed by the volume of air 94 trapped within the chamber at the time of fastening the closure cap 17 thereto. This air volume within chamber 7, when compressed by pressure being applied to the oil in the system, is reduced in volume, thereby allowing a small quantity of oil to flow from the reservoir into the test chamber through connections 87 and 86 to raise the oil level therein slightly above the lower edge of the admission port 92 at the terminal of connection 86. As pressure is exhausted from the system, at the completion of the testing cycle, that portion of the oil above the mouth of port 92 will be forced back into the reservoir by the expanding air 94. The oil level within the test chamber in being raised in the foregoing manner is maintained substantially constant even though a small quantity of the oil is removed therefrom on the surface of each device tested.

As valve 47 is moved to its third position, as indicated by the pointer 93 on sleeve 39 moving adjacent the inscription "Pressure booster" on ring dial 32, the connection 86 to the test chamber is closed off whereby the air and oil therein is trapped within the chamber at line pressure. This final positioning of the valve leaves the system in condition for operating the pressure boosting piston 80 by the admission of air or other suitable gas into chamber 62 beneath the base 81 of the piston through a fluid circuit normally closed by the ball 91, best seen in Fig. 10.

Air is admitted to this fluid circuit through a plug connector 95 that is suitably threaded into the lower disk section 13 of the body member through an opening 96 provided therefor in the casing wall. From the connector 95, the air passes through bore 97 up along the outer surface 98 of the piston 80, thence into transverse port 68 therein and down through the center 99 thereof to the ball valve generally designated 100 by way of the connecting bores 101, 102. The end of bore 99 is conveniently closed and sealed as by a plug 131. At such time as the ball is lifted from its normal position across the air inlet 103 air will flow through the valve chamber 104 and bore 105 into chamber 62 to increase the pressure therein for driving the piston 80 upwardly against the oil in cylinder 82.

The ball 91 of the valve is normally maintained across the air inlet 103 by pin 106, the necessary force being applied to the pin by bolt 107, Fig. 2, as the bolt is urged in the direction of the pin by spring 108 under compression between the head 109 of the bolt and the bottom of bore 110 in body member 6. Bolt 107 conveniently is mounted for sliding movement within tube 14, and pin 106, in turn, is slideably mounted in a tube 69 which is slideably interfitted within tube 14 and terminates in a screw plug 70. Plug 70 closes valve chamber 104 and is so formed as to provide a seat for ball 91 and to retain the ball in operative spaced relation with respect to the seat, as will appear more fully hereinafter.

As handle 40 is rotated through the "Pressure booster" position, sleeve 39 is operative, by means of the cam surface 111 thereon, to lift bolt 107 clear of the pin, thereby allowing the pressure of the air within the entrance port 103 to force the ball and pin upwardly to the extent of closing the exhaust port 112 within which the reduced section 113 of pin 106 freely moves, Fig. 10. The seating of the ball over the exhaust port allows all of the gas now entering through port 103 to flow into chamber 62 by way of bore 105. The pressure of the gas within the valve chamber 104 is sufficient, by reason of the restricting guide surface 114, to maintain the ball 91 in seated position across the exhaust port 112 until such time as pin 106 is forced downward against the ball by the engagement therewith of bolt 107.

Bolt 107 carries a stud 118 upon which a pair of rollers 117 are mounted for rolling engagement with slot 116 formed in body member 6. The sides 115 of notch 116 are adapted to support and guide the rollers 117 as bolt 107 is lifted through the stud connection 113, the rollers operating to reduce the friction of the stud against the sides of the notch as force is applied to roller 120 by the cam surface 111 as sleeve 39 is rotated by handle 40 from a direction substantially transversely to the movement of the bolt.

The increasing pressure within chamber 62, as caused by the admission of air thereinto through the now open valve 100, causes the piston 80 to move upwardly against the oil in cylinder 82 thereby forcing a portion of the oil from the cylinder up through the connection 83 and into the test chamber 7 to increase the pressure therein proportional to the movement of the piston.

As the piston 80 moves upwardly, pin 106 carried thereby is lifted into engagement with the head of bolt 107, the bolt stops further upward movement of the pin, thereby causing it, as the piston continues to rise, to press downward on ball 91 and drive the ball out of seated position across the exhaust port 112. When this occurs, the gas entering through port 103 is exhausted into the atmosphere through ports 121 and 122.

If the air is caused to be exhausted from the system faster than admitted thereto, as the result of the over travel of the piston, the consequential drop in pressure within chamber 62 will allow the piston to move downward to reduce the pressure on pin 106 thereby allowing the ball to move upward or nearer the exhaust port 112, thereby reducing the flow of gas therethrough and movement of the piston. The handle 40, by the rotation of the cam surface 111 on sleeve 39, is operative in this manner to maintain the piston in whatever position desired to provide the necessary test pressure within chamber 7.

To exhaust the system at the completion of the testing cycle, handle 40 is rotated to the "Hold" position, Fig. 5, thereby moving cam surface 111 out of supporting engagement with the stud 118 whereupon bolt 107 is moved forcefully downward by the urge of spring 108 against the pin 106 in such a manner as to drive ball 91 into seated position across the air inlet 103. When this occurs, further entrance of air into valve chamber 104 is prevented. The movement of the ball away from the exhaust port 112 allows gas from chamber 62 to exhaust into the atmosphere through ports 121 and 122, as described heretofore, whereupon the piston is gradually driven downwardly to its initial position with chamber 62 by the urge of spring 132 and by the remaining pressure within the test chamber 7. After chamber 62 has been exhausted, control handle 40 may then be moved to the "Exhaust" position, Fig. 3, for exhausting the remaining pressure within test chamber 7 into the atmosphere by way of reservoir 11.

In order to inform the operator at all times of the pressure existing within test chamber 7, a plurality of gauges 123, 124 and 125 extending through an opening 133 provided therefor in sleeve member 39, are arranged about the body member 6 and mounted thereon in pressure responsive relation to the pressure within the test chamber.

These gauges, in order to obtain a more accurate reading of the pressure within the test chamber, vary in pressure response, the low pressure gauges 123 and 124, being operative to register more accurately pressures within the lower pressure ranges of the instant device while the high pressure gauge 125 indicating pressures exceeding the response of the more senstive low pressure gauges.

To protect the low pressure gauges from pressures in excess of the maximum pressures for which they were designed, each of the gauges is provided with a pressure responsive safety valve assembly, generally designated 126, that is operative to close the fluid circuit from the test chamber to the gauge when the pressure within the chamber exceeds the maximum pressure reading of the gauge by a predetermined valve.

Valve assembly 126 includes a spool shaped piston 127 slideably arranged within a vertical bore 128 provided therefor in body member 6 at the base of test chamber 7. The base of piston 127 is exposed to the atmosphere through port 130 while the upper surface thereof is in constant communication with the pressure within the test chamber. The piston is normally retained in open circuit position adjacent the retaining ring 129 therefor by the urge of spring 130 interposed between the piston and an adjustable plug 131, and is adapted to be moved downwardly against the spring in response to pressure applied to the piston by the fluid within the test chamber and toward a valve closing position when the pressure against the upper surface of the piston exceeds that of the spring by a predetermined amount. By adjusting plug 131, the initial compression of spring 130 may be varied in a manner to initially determine the maximum operating pressure of the gauge.

Normally, pressure from test chamber 7 is communicated to gauge 124 by way of groove 135 provided in the wall of bore 128, the groove serving to pass the pressure beneath the upper O ring 4D of the piston and about the reduced side 136 thereof and thence to the gauge through port 137.

When the force applied to the upper surface of piston 127, by the fluid in the test chamber, exceeds that of the combined force of spring 137 and the atmosphere, the piston is driven downwardly within bore 128 until the piston comes to rest against the upright stud which forms an integral part of the adjustable plug 131. This stud is adapted to stop the piston after the upper O ring 4C thereon has passed below the lower end of groove 135, whereby the circuit to the gauge is closed off at a pressure corresponding to the aforesaid maximum operating pressure of the gauge. It will be understood that a similar pressure cut off arrangement, not shown, is provided for gauge 123.

As sufficient pressure is generated within the test chamber by the operation of the apparatus heretofore described to cause operation of switch 8 under test, signal lamps 74 are illuminated to inform the operator of the moment of closing of the switch contacts whereby a reading may be taken of the pressure indicated on the dial system.

While this invention has been described with reference to a preferred embodiment thereof which gives satisfactory results, it is to be understood by those skilled in the art to which the invention pertains, after understanding the invention, that various changes and modifications may be made therein without departing from the spirit and scope of the invention, and it is intended therefore, in the appended claims to cover all such changes and modifications.

The invention herein described and claimed may be manufactured and used by or for the Government of the United States of America for governmental purposes without the payment of any royalties thereon or therefor.

What is claimed as new and desired to be secured by Letters Patent of the United States is:

1. A hydraulic test set for testing pressure responsive apparatus, including first and second liquid receptacles, fluid communicating means connecting said receptacles, a cap for closing the first said receptacle including means for supporting the apparatus to be tested, a piston movable within said second receptacle for forcing a portion of the fluid therein through said fluid communicating means and into said first receptacle to thereby increase the pressure therein proportional to the movement of the piston, pressure indicating means in fluid communication with the first said receptacle for registering the pressure therein, means for moving said piston including a gas pressure chamber for applying pressure to the base of the piston, gas communicating means for supplying gas to said chamber from a source of gas under pressure, a valve arranged in said gas communicating means and operable to control the flow of gas therethrough responsive to movement of said piston, a handle member, a cam surface movable by said handle, and a yieldable linkage operatively connecting said valve and cam surface to further control operation of said valve upon predetermined movement of said handle.

2. A hydraulic test set according to claim 1 further characterized in that the pressure indicating means comprises a plurality of gauges arranged in fluid communication with the first receptacle and having different calibrated ranges of pressure response, and pressure responsive means for successively cutting said gauges out of fluid communication with the first receptacle as the pressure therein is increased beyond the calibrated ranges of the respective gauges.

3. A test set according to claim 1 and having in addition to said first and second fluid receptacles a fluid reservoir, fluid communicating means interconnecting the first receptacle and said reservoir, and a selector valve arranged within said second fluid communicating means and operable to control the flow of fluid therethrough in response to adjustment of the handle.

4. A hydraulic test set of the character disclosed including a fluid receptacle, a cap for closing said receptacle including means for supporting the apparatus to be tested, a second fluid receptacle in fluid communication with said first receptacle, a piston having a reduced portion movable into said second receptacle for forcing a portion of the fluid therein out through said communicating means and into the first receptacle to increase the pressure therein in proportion to the movement of said piston, said piston having an enlarged pressure receiving surface, means enclosing said piston surface to form a pressure chamber whereby gaseous pressure may be applied to said surface to drive the piston, gas communicating means connecting said pressure chamber with a source of gas under pressure, a control valve carried by said piston operatively connected in said gas communicating means to control the flow of gas therethrough, operating means for said valve including an adjustable handle member, a cam surface movable by said handle member upon adjustment thereof, a linkage assembly operatively engageable by said cam surface for controlling said valve upon a predetermined movement of the piston, and a multiple gauge system in fluid communication with the first named receptacle and operative to indicate progressively the changes in pressure therein as the gaseous pressure is changed in said pressure chamber under control of said valve.

5. A hydraulic test set of the character disclosed including a first fluid receptacle, a cap for closing said receptacle and including means for supporting the apparatus to be tested, a second receptacle in fluid communication with the first receptacle, a piston having a driving surface and a reduced portion movable into said second receptacle for forcing a portion of the fluid therein out through said communicating means and into the first said receptacle to increase the pressure therein in proportion to the movement of said piston, means inclosing said driving surface to form a gas pressure chamber whereby gaseous pressure may be applied to said driving surface, gas communicating means connecting said pressure chamber with a source of gas under pressure, a control valve operatively connected in said gas communicating means to control the flow of gas therethrough, operating means for said valve including an adjustable handle member, a sleeve member arranged about said housing and rotatable by said handle, a cam surface arranged on

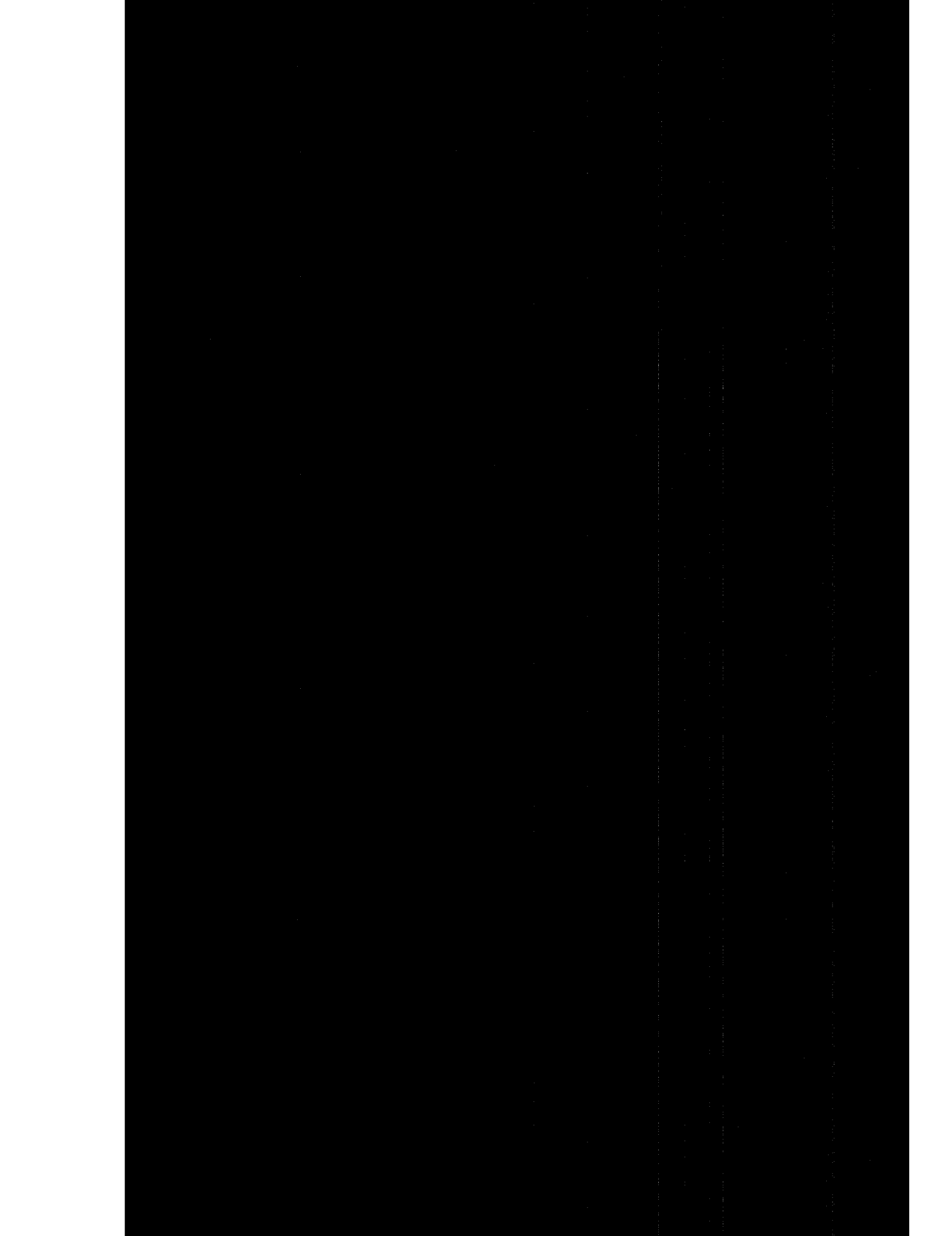

by said piston and adjustable variably in accordance with the movement of the piston for controlling the gas pressure applied thereto.

11. A testing device according to claim 10 further characterized in that the valve means comprises an adjustable member and a coacting valve member carried by the piston and movable with respect to a seat thereon in accordance with the pressure of the gas on the valve member and in accordance with the position of the piston with respect to the adjustable member.

GEORGE H. LEONARD.

REFERENCES CITED

The following references are of record in the file of this patent:

UNITED STATES PATENTS

| Number | Name | Date |
|---|---|---|
| 1,905,668 | White | Apr. 25, 1933 |
| 2,026,079 | White et al. | Dec. 31, 1935 |
| 2,310,974 | Lumm | Feb. 16, 1943 |
| 2,332,725 | Jordan | Oct. 26, 7943 |
| 2,354,562 | Webb | July 25, 1944 |
| 2,364,709 | Greer | Dec. 12, 1944 |